United States Patent
Munje et al.

(10) Patent No.: US 8,831,576 B2
(45) Date of Patent: *Sep. 9, 2014

(54) APPARATUS AND METHODS FOR OVER THE AIR PROVISIONING OF A SINGLE PDP CONTEXT MOBILE COMMUNICATIONS DEVICE

(75) Inventors: Arun Munje, Kanata (CA); Risvan Coskun, Ottawa (CA); Jean-Phillippe Cormier, Ottawa (CA)

(73) Assignee: BlackBerry Limited, Waterloo (CA)

( * ) Notice: Subject to any disclaimer, the term of this patent is extended or adjusted under 35 U.S.C. 154(b) by 835 days.

This patent is subject to a terminal disclaimer.

(21) Appl. No.: 12/272,029

(22) Filed: Nov. 17, 2008

(65) Prior Publication Data

US 2009/0068997 A1  Mar. 12, 2009

Related U.S. Application Data

(63) Continuation of application No. 10/981,416, filed on Nov. 4, 2004, now Pat. No. 7,464,169.

(51) Int. Cl.
*H04M 3/42* (2006.01)
*H04W 76/02* (2009.01)
*H04W 80/00* (2009.01)
*H04W 36/00* (2009.01)
*H04W 76/06* (2009.01)
*H04W 28/18* (2009.01)

(52) U.S. Cl.
CPC ............ *H04W 76/022* (2013.01); *H04W 80/00* (2013.01); *H04W 36/00* (2013.01); *H04W 76/062* (2013.01); *H04W 28/18* (2013.01)
USPC ...................................... 455/414.1; 370/330

(58) Field of Classification Search
USPC ......... 455/414.1, 452.1, 452.2; 370/328, 330, 370/338, 352, 354
See application file for complete search history.

(56) References Cited

U.S. PATENT DOCUMENTS 5,940,383 A  8/1999  Willkie
6,144,849 A  11/2000  Nodoushani et al.

(Continued)

FOREIGN PATENT DOCUMENTS

DE  100 46 345 A1  3/2002
DE  10046345  3/2002

(Continued)

OTHER PUBLICATIONS

European Search Report Application No. 04256833.7; European Patent Office; Mar. 24, 2005; 9 pages.

(Continued)

*Primary Examiner* — Myron K Wyche
(74) *Attorney, Agent, or Firm* — The Danamraj Law Group, P.C.

(57) ABSTRACT

A mobile communications device and registration server and methods of use thereof. The mobile communications device comprises means for establishing a first data context and means for establishing a second data context. The first data context is established to transmit a request for parameters from the mobile communications device to a first network node and to receive at the mobile communications device a response from the first network node including the parameters. The second data context is established by transmitting the parameters from the mobile communications device to the second network node.

20 Claims, 5 Drawing Sheets

(56) References Cited

U.S. PATENT DOCUMENTS

| | | | |
|---|---|---|---|
| 6,381,454 | B1 | 4/2002 | Tiedemann, Jr. et al. |
| 6,529,729 | B1 | 3/2003 | Nodoushani et al. |
| 6,615,269 | B1 | 9/2003 | Suumaki et al. |
| 6,636,502 | B1 * | 10/2003 | Lager et al. ............... 370/352 |
| 6,711,141 | B1 * | 3/2004 | Rinne et al. ............... 370/328 |
| 6,725,056 | B1 | 4/2004 | Moles et al. |
| 6,799,203 | B2 | 9/2004 | Oommen |
| 6,804,707 | B1 | 10/2004 | Ronning |
| 6,804,722 | B1 | 10/2004 | Nishi |
| 6,879,820 | B2 | 4/2005 | Bjelland et al. |
| 6,912,221 | B1 * | 6/2005 | Zadikian et al. ......... 370/395.21 |
| 6,987,779 | B1 * | 1/2006 | Sevanto et al. ............... 370/469 |
| 6,987,799 | B2 * | 1/2006 | McDonough et al. ........ 375/149 |
| 7,069,056 | B2 | 6/2006 | Iwata et al. |
| 7,266,371 | B1 | 9/2007 | Amin et al. |
| 7,317,899 | B2 | 1/2008 | Hiroki |
| 7,433,961 | B2 | 10/2008 | Munje et al. |
| 7,634,274 | B2 | 12/2009 | Hurtta |
| 7,685,233 | B2 | 3/2010 | Munje et al. |
| 2002/0029269 | A1 | 3/2002 | McCarty et al. |
| 2002/0062379 | A1 | 5/2002 | Widegren et al. |
| 2002/0123335 | A1 | 9/2002 | Luna et al. |
| 2003/0028649 | A1 | 2/2003 | Uhik et al. |
| 2003/0060210 | A1 * | 3/2003 | Ravishankar et al. ......... 455/452 |
| 2004/0054719 | A1 | 3/2004 | Daigle et al. |
| 2004/0100940 | A1 | 5/2004 | Kuure et al. |
| 2004/0117459 | A1 | 6/2004 | Fry |
| 2010/0135218 | A1 | 6/2010 | Munje et al. |

FOREIGN PATENT DOCUMENTS

| | | |
|---|---|---|
| EP | 1657938 | 3/2010 |
| EP | 2205038 | 7/2010 |
| WO | 02104046 A1 | 12/2002 |
| WO | 03024139 A2 | 3/2003 |
| WO | 03096724 A1 | 11/2003 |

OTHER PUBLICATIONS

European Search Report; European Patent Office Application No. 04256833.7; Apr. 15, 2005; 6 pages.

CIPO, Office Action, Application No. 2,526,396, Jul. 6, 2009, 3 pgs.

CIPO, Office Action, Application No. 2,526,396, Jul. 12, 2010, 2 pgs.

CIPO, Notice of Allowance, Application No. 2,526,396, Jun. 30, 2011, 1 pg.

CIPO, Office Action, Application No. 2,753,305, Nov. 21, 2011, 3 pgs.

CIPO, Office Action, Application No. 2,753,305, May 23, 2012, 4 pgs.

EPO, European Search Report, Application No. 04257081.2, Apr. 21, 2005, 8 pgs.

EPO, Communication Pursuant to Article 96(2) EPC, Application No. 04257081.2, May 7, 2007, 5 pgs.

EPO, Communication Pursuant to Article 94(3) EPC, Application No. 04257081.2, Feb. 26, 2008, 6 pgs.

EPO, Summons to Attend Oral Proceedings Pursuant to Rule 115(1) EPC, Application No. 04257081.2, Feb. 23, 2009, 3 pgs.

EPO, Communication Under Rule 71(3) EPC, Application No. 04257081.2, Oct. 2, 2009, 6 pgs.

EPO, Extended Search Report, Application No. 10153005.3, Jun. 8, 2010, 8 pgs.

EPO, Communication Pursuant to Article 94(3) EPC, Application No. 10153005.3, Feb. 1, 2012, 6 pgs.

EPO, Summons to Attend Oral Proceedings Pursuant to Rule 115(1) EPC, Application No. 10153005.3, Jun. 19, 2012, 5 pgs.

USPTO, Office Action, U.S. App. No. 10/981,416, Jan. 18, 2008, 7 pgs.

USPTO, Office Action, U.S. Appl. No. 10/990,073, Jan. 18, 2008, 8 pgs.

USPTO, Notice of Allowance, U.S. Appl. No. 10/990,073, Jun. 9, 2008, 9 pgs.

USPTO, Office Action, U.S. Appl. No. 12/188,958, Jun. 10, 2009, 9 pgs.

USPTO, Notice of Allowance, U.S. Appl. No. 12/188,958, Nov. 4, 2009, 4 pgs.

USPTO, Office Action, U.S. Appl. No. 12/698,491, May 12, 2011, 10 pgs.

USPTO, Office Action, U.S. Appl. No. 12/698,491, Oct. 18, 2011, 11 pgs.

CA Office Action, Application No. 2,525,169, Canadian IPO, Sep. 30, 2009, 2 pgs.

* cited by examiner

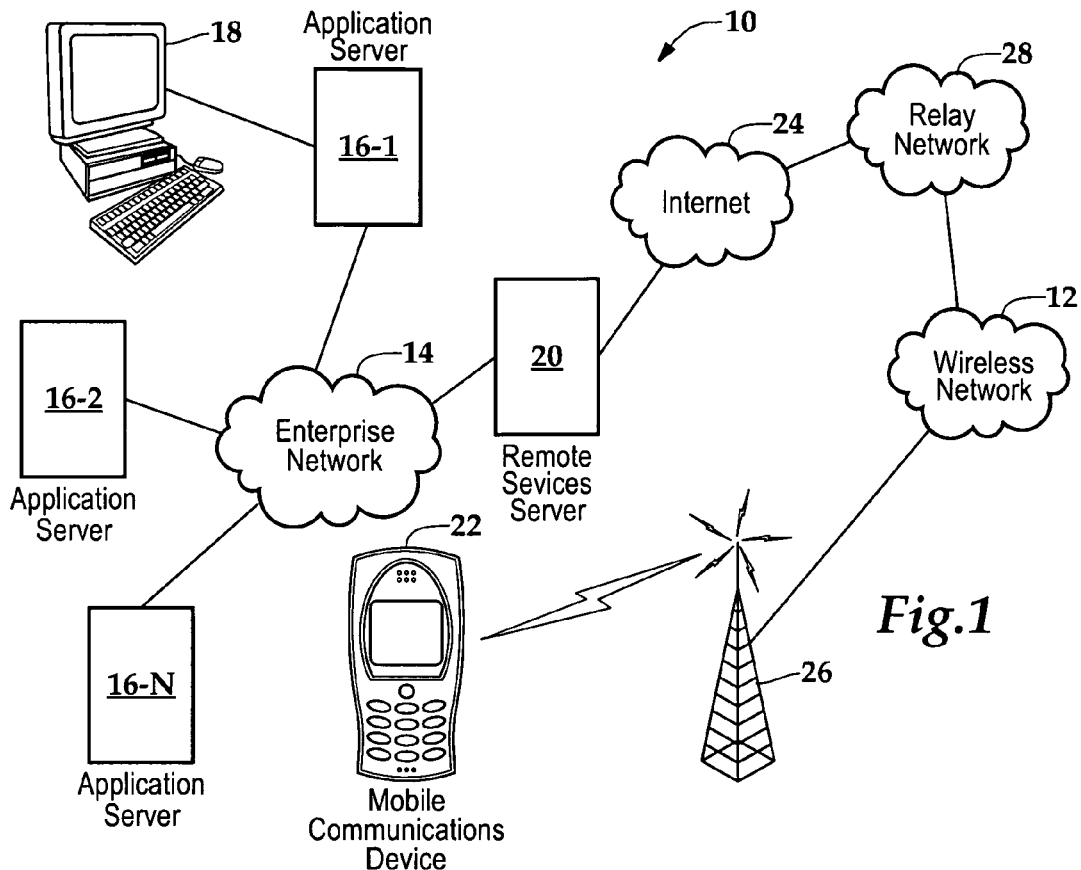
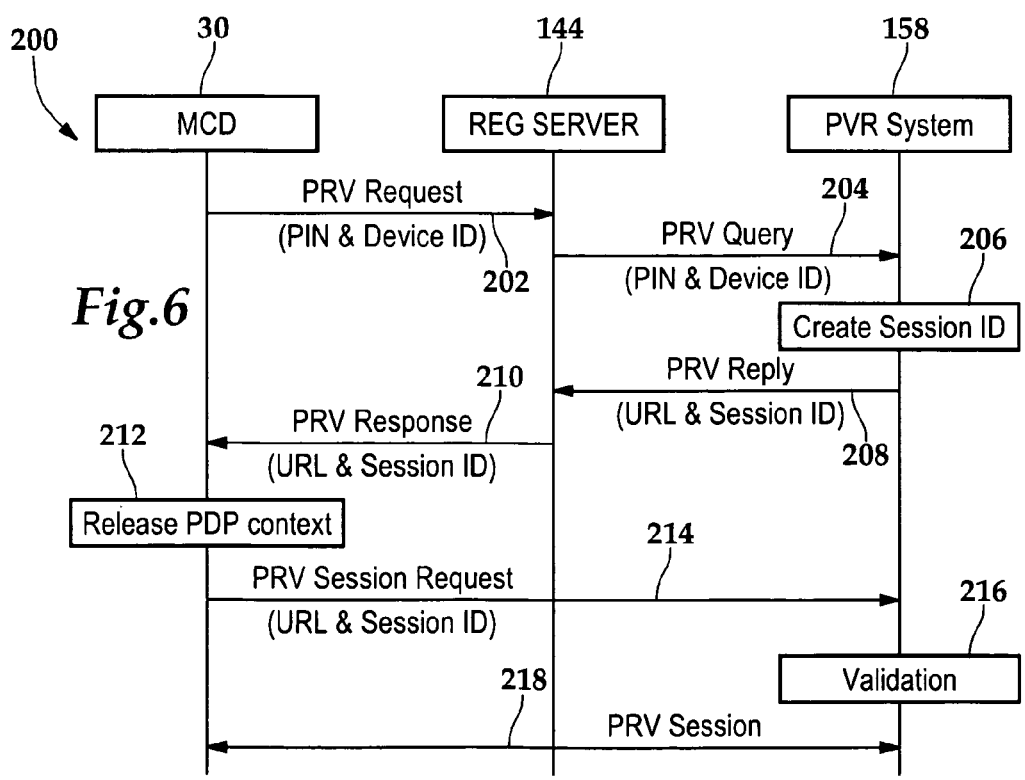

APPARATUS AND METHODS FOR OVER THE AIR PROVISIONING OF A SINGLE PDP CONTEXT MOBILE COMMUNICATIONS DEVICE

CROSS-REFERENCE TO RELATED APPLICATIONS

This application claims priority to U.S. patent application Ser. No. 10/981,416, filed Nov. 4, 2004, which is hereby incorporated by reference.

TECHNICAL FIELD OF THE APPLICATION

The present disclosure relates, in general, to wireless packet data service networks and, in particular, to apparatuses and methods for over the air provisioning of a single PDP context mobile communications device operable to be disposed in the wireless packet data service network.

BRIEF DESCRIPTION OF THE DRAWINGS

For a more complete understanding of the features and advantages of the present methods and apparatuses, reference is now made to the detailed description along with the accompanying figures in which corresponding numerals in the different figures refer to corresponding parts and in which:

FIG. 1 depicts an exemplary network environment including a wireless packet data service network wherein an embodiment of the present method may be practiced;

FIG. 6 depicts a message flow diagram with respect to establishing a communication session for provisioning a single PDP context mobile communications device.

DETAILED DESCRIPTION OF THE DRAWINGS

Figure 2:
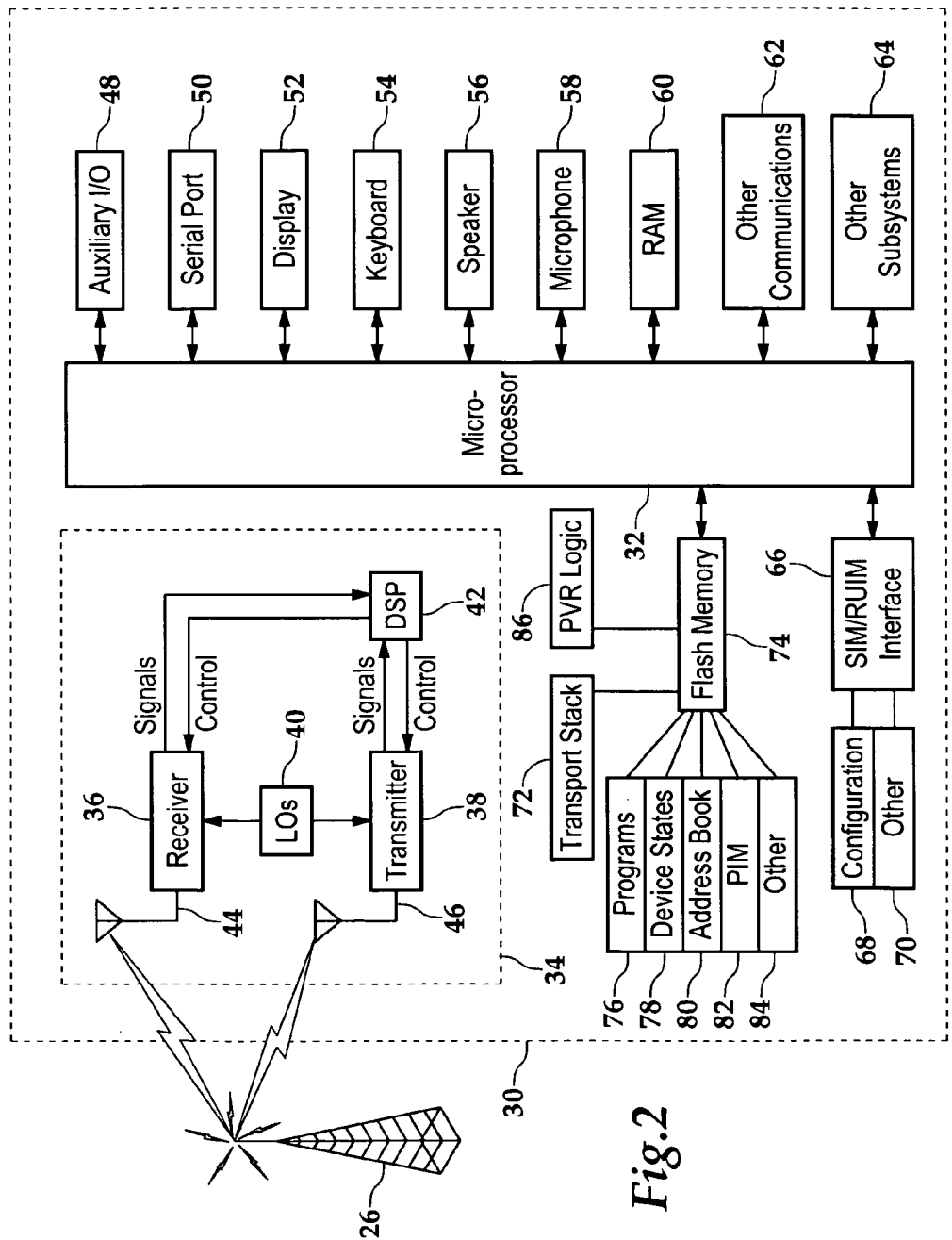
FIG. 2 depicts a block diagram of a mobile communications device according to one embodiment of the present disclosure.

While various embodiments of a mobile communications device and registration server operating within a network system are discussed in detail below, it should be appreciated that the present disclosure provides many applicable inventive concepts which can be embodied in a wide variety of specific contexts. The specific embodiments discussed herein are merely illustrative of specific ways to use the mobile communications device and registration server within the network system, and do not delimit the scope of the present disclosure.

According to a first aspect, the present disclosure relates to a method for provisioning a mobile communications device. The method comprises establishing a first data context to transmit a request for parameters from the mobile communications device to a first network node and to receive at the mobile communications device a response from the first network node including the parameters. The method further comprises establishing a second data context between the mobile communications device and a second network node by transmitting the parameters from the mobile communications device to the second network node.

In certain embodiments of the method, the first network node is operable as part of a relay network. The second node may be operable as part of a provisioning system. In certain embodiments, the first and second data contexts may be PDP contexts. In one embodiment, the first data context may be non web based while the second data context is web based.

According to a second aspect, the present disclosure relates to a mobile communications device. The device comprises means for establishing a first data context to transmit a request for parameters from the mobile communications device to a first network node and to receive at the mobile communications device a response from the first network node including the parameters. The device further comprises means for establishing a second data context between the mobile communications device and a second network node by transmitting the parameters from the mobile communications device to the second network node.

According to the third aspect, the present disclosure relates to a method for provisioning a mobile communications device. The method comprises establishing a first data context between a first network node and the mobile communications device. The method further comprises receiving at the first network node from the mobile communications device a request for parameters to be transmitted from the mobile communications device to a second network node for provisioning of the mobile communications device and transmitting a response from the first network node to the mobile communications device. The response includes the parameters to be transmitted from the mobile communications device to the second network node for provisioning of the mobile communications device.

According to the fourth aspect, the present disclosure relates to a registration server. The server comprises means for establishing a first data context between the registration server and a mobile communications device. The server further comprises means for receiving at the registration server from the mobile communications device a request for parameters to be transmitted from the mobile communications device to a second network node for provisioning of the mobile communications device and means for transmitting a response from the registration server to the mobile communications device. The response includes the parameters to be transmitted from the mobile communications device to the second network node for provisioning of the mobile communications device.

Referring now to the drawings, and more particularly to FIG. 1, depicted therein is an exemplary network environment 10 including a wireless packet data service network 12 wherein an embodiment of the present method may be practiced. An enterprise network 14 for serving a plurality of corporate users, which may be a packet-switched network, can include one or more geographic sites and be organized as a local area network (LAN), a wide area network (WAN), a metropolitan area network (MAN) or the like. A number of application servers 16-1 through 16-N disposed as part of the enterprise network 14 are operable to provide or effectuate a host of internal and external services such as email, video mail, Internet access, corporate data access, messaging, calendaring and scheduling, information management and the like. Accordingly, a diverse array of personal information appliances 18 such as desktop computers, laptop computers, palmtop computers or the like may be operably networked to one or more of the application servers 16-i, i=1, 2, ..., N, with respect to the services supported in the enterprise network 14.

Additionally, a remote services server 20 may be interfaced with the enterprise network 14 for enabling a corporate user to access or effectuate any of the services from a remote location using a suitable single PDP context mobile communications device (MCD) 22. A secure communication link with end-to-end encryption may be established that is mediated through an external IP network, i.e., a public packet-switched network such as the Internet 24, as well as the wireless packet data service network 12 operable with MCD 22 via suitable wireless network infrastructure that includes a base station 26. In one embodiment, a trusted relay network 28 may be disposed between the Internet 24 and the infrastructure of wireless packet data service network 12. By way of example, MCD 22 may be a data-enabled handheld device capable of receiving and sending messages, web browsing, interfacing with corporate application servers and the like.

For purposes of the present disclosure, the wireless packet data service network 12 may be implemented in any known or heretofore unknown mobile communications technologies and network protocols, as long as a packet-switched data service is available therein for transmitting packetized information. For instance, the wireless packet data service network 12 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 12 may comprise an Enhanced Data Rates for GSM Evolution (EDGE) network, an Integrated Digital Enhanced Network (IDEN), a Code Division Multiple Access (CDMA) network, a Universal Mobile Telecommunications System (UMTS) network, or any 3rd Generation (3G) network. As will be seen hereinbelow, the embodiments of the present disclosure for provisioning MCD 22 supporting a single PDP context will be described regardless of any particular wireless network implementation.

FIG. 2 depicts a block diagram of a single PDP context mobile communications device that is generally designated 30. It will be recognized by those skilled in the art upon reference hereto that although an embodiment of MCD 30 may comprise an arrangement similar to one shown in FIG. 2, there can be any number of variations and modifications, in hardware, software or firmware, with respect to the various modules depicted. Accordingly, the arrangement of FIG. 2 should be taken as illustrative rather than limiting with respect to the embodiments of the present disclosure. A microprocessor 32 providing for the overall control of MCD 30 is operably coupled to a communication subsystem 34 which includes a receiver 36 and transmitter 38 as well as associated components such as one or more local oscillator (LO) modules 40 and a processing module such as a digital signal processor (DSP) 42. As will be apparent to those skilled in the field of communications, the particular design of the communication module 34 may be dependent upon the communications network with which the mobile device is intended to operate.

In one embodiment, the communication module 34 is operable with both voice and data communications. Regardless of the particular design, however, signals received by antenna 44 through base station 26 are provided to receiver 36, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 42, and provided to transmitter 44 for digital-to-analog (D/A) conversion, frequency up conversion, filtering, amplification and transmission over the air-radio interface via antenna 46.

Microprocessor 32 also interfaces with further device subsystems such as auxiliary input/output (I/O) 48, serial port 50, display 52, keyboard 54, speaker 56, microphone 58, random access memory (RAM) 60, a short-range communications subsystem 62 and any other device subsystems generally labeled as reference numeral 64. To control access, a Subscriber Identity Module (SIM) or Removable user Identity Module (RUIM) interface 66 is also provided in communication with the microprocessor 32. In one implementation, SIM/RUIM interface 66 is operable with a SIM/RUIM card having a number of key configurations 68 and other information 70 such as identification and subscriber-related data.

Operating system software and software associated with transport stack 72 may be embodied in a persistent storage module (i.e., non-volatile storage) such as Flash memory 74. In one implementation, Flash memory 74 may be segregated into different areas, e.g., storage areas for computer programs 76, device states 78, address book 80, other personal information manager (PIM) data 82 and other data storage areas generally labeled as reference numeral 84. Additionally, a provisioning (PRV) logic module 86 is provided for provisioning certain aspects of MCD 30 according to the teachings set forth herein.

Figure 3:
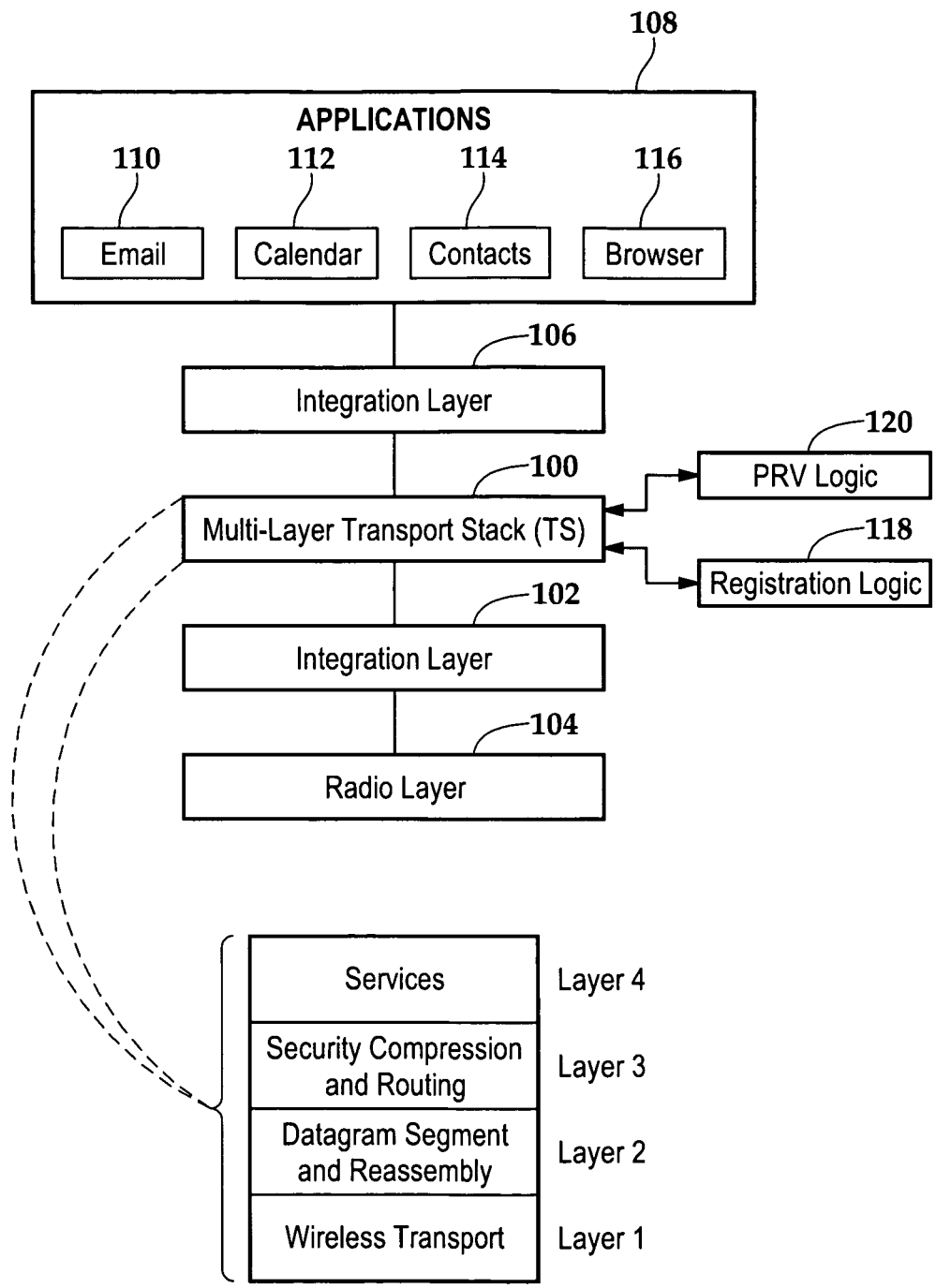
FIG. 3 depicts a software architectural view of a mobile communications device according to one embodiment of the present disclosure.

FIG. 3 depicts a software architectural view of a mobile communications device operable according to one embodiment for provisioning certain aspects of the MCD regardless of the manufacturer of the MCD or the wireless service provider. A multi-layer transport stack (TS) 100 is operable to provide a generic data transport protocol for any type of corporate data, including email, via a reliable, secure and seamless continuous connection to a wireless packet data service network. As illustrated in the embodiment of FIG. 3, an integration layer 102 is operable as an interface between the MCD's radio layer 104 and the transport stack 100. Likewise, another integration layer 106 is provided for interfacing between the transport stack 100 and the user applications 108 supported on the MCD, e.g., email 110, calendar/scheduler 112, contact management 114 and web browser 116. Although not specifically shown, the transport stack 100 may also be interfaced with the MCD's operating system. In another implementation, the transport stack 100 may be provided as part of a data communications client module operable as a host-independent virtual machine on a mobile device.

The bottom layer (Layer 1) of the transport stack 100 is operable as an interface to the wireless network's packet layer. Layer 1 handles basic service coordination within the exemplary network environment 10 shown in FIG. 1. For example, when an MCD roams from one carrier network to another, Layer 1 verifies that the packets are relayed to the appropriate wireless network and that any packets that are pending from the previous network are rerouted to the current network. The top layer (Layer 4) exposes various application interfaces to the services supported on the MCD. The remaining two layers, Layer 2 and Layer 3, are responsible for datagram segmentation/reassembly and security, compression and routing, respectively.

FIG. 3 also depicts a registration logic module 118 provided as part of the MCD's software environment that is disposed in operable communication with the transport stack 100 as well as the OS environment for effectuating registration procedures, as and when needed, with the serving relay network. In one implementation, where a PIN is not otherwise provided or associated with the MCD, the registration logic module 118 includes logic means operable to execute a registration procedure with the serving relay node to request and receive a PIN, which will allow identification of the MCD by this network node during future communication sessions therebetween.

A PRV logic module 120 provided as part of the MCD's software environment is disposed in operable communication with the transport stack 100 as well as the OS environment. In one embodiment, the PRV logic module 120 comprises logic operable to generate a request including the PIN and at least one hardware device identifier associated with the MCD for transmission in a message to a network node such as the above mentioned serving relay node with an associated registration server, provisioning server and the like. As stated above, the PIN may be a required parameter in communications between an MCD and the serving relay node for identification and verification purposes. As one of ordinary skill in the art should appreciate, the hardware device identifier may comprise International Mobile station Equipment Identity (IMEI) parameters, International Mobile Subscriber Identity (IMSI) parameters, Electronic Serial Number (ESN) parameters, Mobile Identification Number (MIN) parameters, or the like, that are hard-coded into MCDs depending on the wireless network technologies and protocols. Additionally, IP addresses corresponding to the MCDs may also operate as device identifiers. The PRV logic module 120 may then receive from the network node a URL having a session ID appended thereto or otherwise associated therewith that may be based upon such techniques as hashing of the PIN, the hardware device identifier or both. This URL and session ID is then available to browser 116 such that a suitable WAP communication session can be established between the MCD and an appropriate provisioning server such that certain aspects of the MCD may be provisioned.

Figure 4:
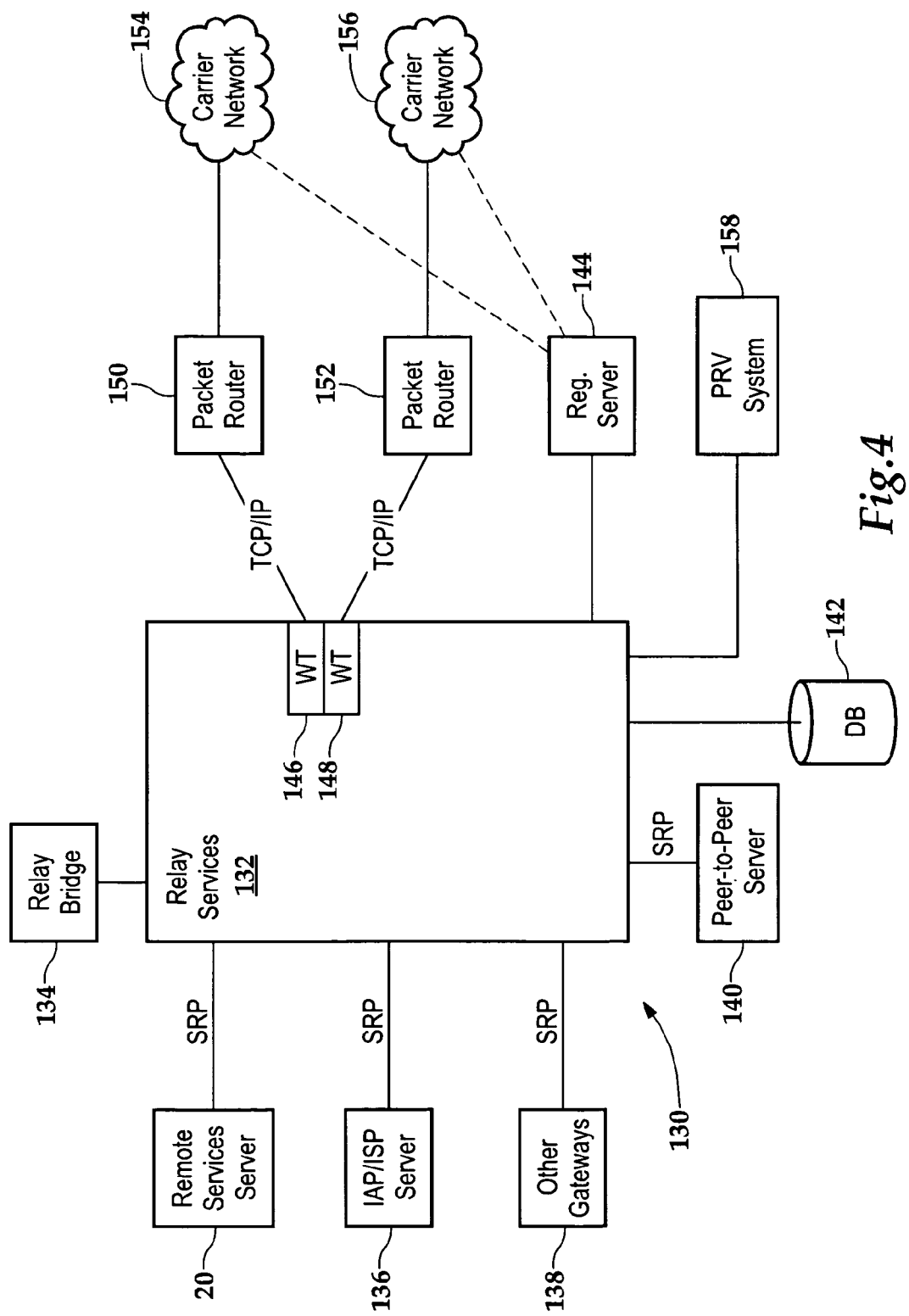
FIG. 4 depicts additional details of an exemplary relay network operable with a mobile communications device in accordance with an embodiment of the present disclosure.

FIG. 4 depicts additional details of an exemplary relay network infrastructure 130 operable as part of relay network 28 interfacing with the wireless packet data service network 12 described above. A relay services node 132 is operable, at least in part, for providing connectivity between MCDs and various data application services such as enterprise services, external IP data services and the like, regardless of the geographic location of the MCDs and their respective wireless carriers. Also, since multiple relay services nodes can co-exist in a distributed network architecture, a relay bridge 134 may be provided in operable connection with the relay services node 132 for supporting inter-relay connectivity. In one implementation, relay bridge 134 connects with separate relay node sites, forming tunnels between relays over which MCD messages can flow to and from services, irrespective of the region where the MCD is in.

Communication between the relay services node 132 and various application gateways and servers is effectuated using any suitable protocol, e.g., Server Relay Protocol (SRP), preferably over IP links. By way of illustration, remote services server 20 associated with the enterprise network 14 (shown in FIG. 1) communicates with the relay using SRP for effectuating internal data services with respect to the enterprise's mobile subscribers. Likewise, reference numerals 136 and 138 refer to external application gateways, such as Internet Service Provider (ISP) or Internet Access Provider (IAP) servers, and other gateways, respectively, which are also interfaced with the relay node 132 using SRP. A peer-to-peer server 140 may also be provided in operable connection with the relay node 132 for handling peer-level messaging between two MCDs.

Additionally, a database 142 may be provided in operable connection with the relay node 132 for handling and managing MCD location information. Preferably, this location information is stored by PIN of the MCDs, wherein the records maintain a particular device's last known location. A registration server 144 is operable for providing registration services for MCDs when they are initially activated or when the user re-registers due to moving to a different wireless network coverage area. In one implementation, the location information of registration server 144 may be programmed into an MCD. When the MCD registers successfully, registration server 144 is operable to provide the serving relay node's location, whereupon data sessions may be engaged by the MCD.

One or more wireless transport (WT) interfaces are provided as part of relay services node 132 for connecting with wireless carrier networks that service MCDs. By way of illustration, WT 146 and WT 148 communicate with respective packet routers 150 and 152 using TCP/IP links, which route data packets to and from respective wireless packet data service networks, exemplified in FIG. 4 as carrier network 154 and carrier network 156. Although not specifically shown, registration server 144, which handles administration and registration services for MCDs, may be provided with separate WT and packet routing for interfacing with the carrier networks 154, 156.

A provisioning system (PRV) 158 may be colocated, integrated or otherwise associated with the relay services node 132 for setting up and managing various service providers (i.e., carrier networks), subscribers, MCD manufacturers, resellers and other entities in order to support any number of service and market differentiation requirements. Additionally, the provisioning system 158 may include logic for provisioning personal information and preferences with respect to certain aspects of the MCDs when they are initially activated for the associated services. Also, subscriber validation logic may be provided as part of the provisioning system 158. Accordingly, the provisioning system 158 may be implemented with a plurality of interfaces with respect to the various modules of the relay services node 132, e.g., interfaces to registration servers, peer-to-peer servers, location databases and the like, in addition to including attendant service logic processing that may be realized in suitable hardware, firmware and/or firmware logic blocks as well as database structures.

Figure 5:
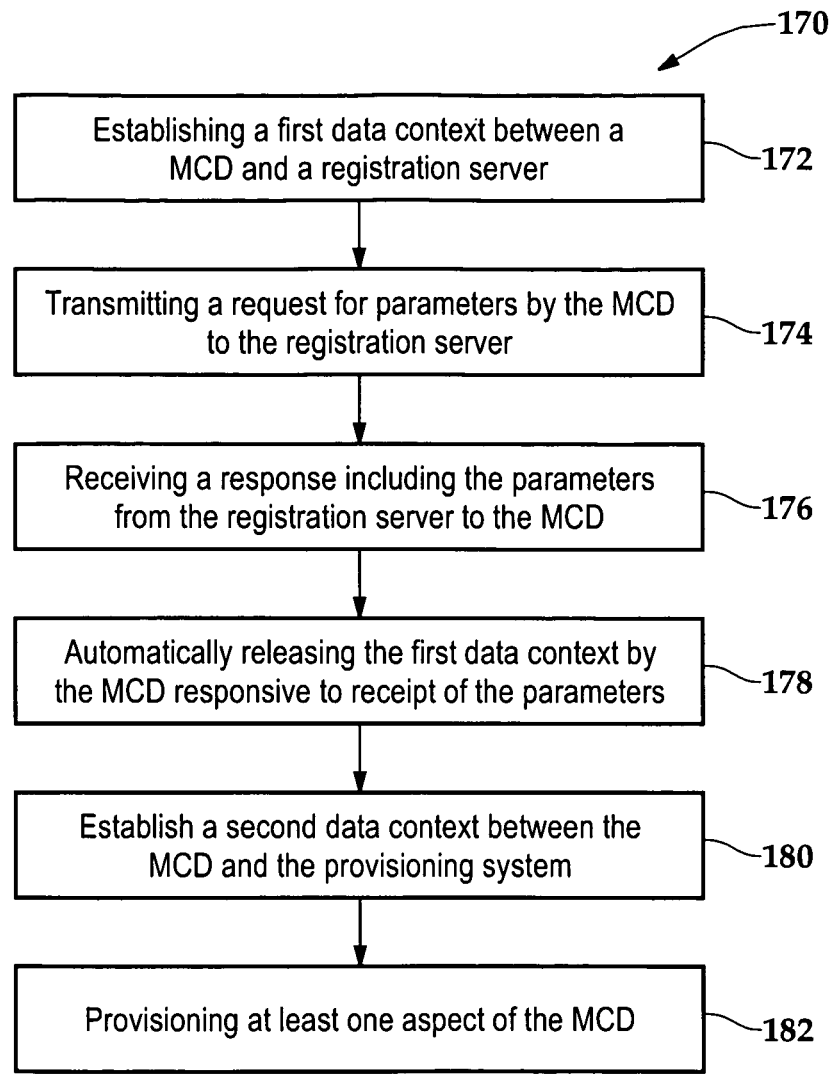
FIG. 5 depicts a flowchart of an embodiment for establishing a communication session for provisioning a single PDP context mobile communications device.

FIG. 5 depicts a flowchart of an embodiment for establishing sequential PDP contexts with a MCD that supports a single PDP context such that the MCD can be provisioned over the air via a remote provisioning system. In the present embodiment, the communication sessions may be both web based and non web based communication sessions preferably using Wireless Application Protocol (WAP) or other suitable communication protocol. Prior to full utilization of the MCD, certain aspect of the device's overall functionality may need to be provisioned such as particular parameters to enable information to be pushed to the MCD. The provisioning of these aspects of the MCD may require authentication of the device, via a PIN, a device identifier or both, prior to provisioning. When the MCD is manufactured, one or more device identifiers such as IMEI, IMSI, ESN, MIN or the like are typically associated with the device. A PIN for these desires services, on the other hand, may not be assigned to the device upon manufacturing requiring the user to acquire such a PIN directly from the service provider via an over the air request and response sequence, which may take place with little or no user intervention. Additionally, once the MCD is deployed, it may be provided with an IP address since it is an IP appliance operable with a wireless packet data service network. Once the device has acquired the PIN relating to the aspects of the device the user desires to provision, it is now desirable to make the provisioning process as seamless as possible such as through the use of a web browser.

It has been found, however, that many web browsers used in MCDs are not capable of retrieving and using PIN and device identifier information. In addition, it has been found that many MCDs are capable of only a single PDP context. The present disclosure, however, provides for sequential PDP contexts on the MCD and for communicating the PIN information to the web browser to allow the web browser to establish a communication session with the appropriate provisioning system. As such, those of ordinary skill in the art should recognized that the present disclosure is not only applicable to single PDP context MCDs but also to any MCD/network system wherein the two required PDP contexts cannot simultaneously be active including, but not limited to, a MCD currently conducting its maximum number of PDP contexts, a network capable of supporting only one PDP context with a given MCD or the like.

Specifically, as detailed in method 170 of FIG. 5, once the MCD has the appropriate PIN, the transport stack of the MCD establishes a first data context, which is preferably a non web based PDP context with the registration server (block 172). The transport stack accesses the PIN and device identifier information and transmits a request for parameters to the registration server (block 174). In one embodiment, this request for parameter includes the PIN and a device identifier. This information is then communicated from the registration server to the provisioning system which may be colocated, integrate or otherwise communicably associated with the registration server. The provisioning system can then generate the requested parameters which, in the present example, are a URL associated with the provisioning system and a session ID appended thereto which is preferably based upon the PIN and the device identifier such as by using a hashing technique. Preferably, the provisioning system starts a clock to establish a time frame within which the session ID will be valid. The provisioning system than communicates the requested parameters to the registration server which is still in communication with the MCD via the first data context. The registration server then provides a response including the requested parameters (the URL with session ID parameters) to the MCD which receives this information via the transport stack (block 176). Once the MCD has obtained the requested parameters, the first data context between the MCD and the registration server is automatically released (block 178). The requested parameters are then passed to the web browser which automatically launches the web page associated with the URL, which includes the session ID such that the device information of the MCD is known to the provisioning system. This establishes a second data context, which is preferably a web based PDP context with the provisioning system (block 180). In this communication session, the aspects of the MCD that are associated with this service provider can now be provisioned over the air using well known data entry techniques via the web browser (block 182). As such, the MCD can be seamlessly provisioned by establishing one data context with a registration server to transmit a request for parameters and receive a response including the parameters then automatically releasing that data context and establishing a second data context by transmitting the parameters to a provisioning system.

FIG. 6 depicts a message flow diagram with respect to establishing sequential PDP contexts with a MCD that supports a single PDP context such that the MCD can be provisioned over the air via a remote provisioning system that is generally designated 200. MCD 30 establishes a PDP context wherein a PRV request message 202 is transmitted by MCD 30 to a network node, e.g., registration server 144, wherein the request message 202 includes a PIN as well as a device identifier as parametric information. Registration server 144 queries suitable service logic, which may be embodied as the provisioning system 158 associated with the relay services network described above, by issuing a PRV query 204 thereto, which includes the parametric information received in the PRV request 202. The provisioning system's PRV logic is operable to validate the request and provide, via a PRV reply 208 to the registration server 144, a message including a URL having session ID parameters appended thereto. Within the first PDP context, this information is then transmitted to MCD 30 via PRV response message 210 from registration server 144. Thereafter, MCD 30 automatically releases the first PDP context 212 and establishes a second PDP context with the PVR system 158. This communication session is established by MCD 30 sending a PRV session request 214 including the URL having session ID parameters. In response thereto, the PVR system 158 is operable to validate 216 the request to, among other things, assure that the session ID has not expire. Upon successful validation, a provisioning session 218 between MCD 30 and PVR system 158 may occur to provision the associated aspects of MCD 30.

While this disclosure has described a mobile communications device operating within a network system with reference to illustrative embodiments, this description is not intended to be construed in a limiting sense. Various modifications and combinations of the illustrative embodiments as well as other embodiments, will be apparent to persons skilled in the art upon reference to the description. It is, therefore, intended that the appended claims encompass any such modifications or embodiments.

What is claimed is:

1. A method, operable at a mobile communications device, for provisioning the mobile communications device comprising:
   requesting, from a first network node using a first data context, parameters that are to be used with a provisioning system; and
   upon receiving the parameters that are to be used with a provisioning system from the first network node, automatically releasing the first data context, establishing a second data context between the mobile communications device and the provisioning system, and transmitting the parameters from the mobile communications device to the provisioning system using the second data context to receive provisioning of at least one aspect of the mobile communications device.

2. The method for provisioning a mobile communications device as recited in claim 1 wherein the first network node is operable as part of a relay network.

3. The method for provisioning a mobile communications device as recited in claim 1 wherein the parameters comprise a URL and a session identification number.

4. The method for provisioning a mobile communications device as recited in claim 1 wherein the first and second data contexts are PDP contexts.

5. The method for provisioning a mobile communications device as recited in claim 1 wherein the first data context is non web based and the second data context is web based.

6. A mobile communications device comprising a processor, memory and associated hardware configured to perform the following:
   requesting, from a first network node using a first data context, parameters that are to be used with a provisioning system; and upon receiving the parameters, releasing the first data context, establishing a second data context between the mobile communications device and the provisioning system, and transmitting the parameters from the mobile communications device to the provisioning system to receive provisioning of at least one aspect of the mobile communications device.

7. The mobile communications device as recited in claim 6 wherein the first network node is operable as part of a relay network.

8. The mobile communications device as recited in claim 6 wherein the parameters comprise a URL and a session identification number.

9. The mobile communications device as recited in claim 6 wherein the first and second data contexts are PDP contexts.

10. The mobile communications device as recited in claim 6 wherein the first data context is non web based and the second data context is web based.

11. A method, operable at a first network node, for provisioning a mobile communications device comprising:
   establishing a first data context between the first network node and the mobile communications device;
   receiving at the first network node from the mobile communications device a request for parameters that are to be used with a provisioning system;
   sending a request to the provisioning system for the parameters; and
   receiving at the first network node the parameters from the provisioning system and transmitting a response from the first network node to the mobile communications device, the response including the parameters, the parameters enabling the mobile communications device to receive provisioning of at least one aspect of the mobile communications device.

12. The method for provisioning a mobile communications device as recited in claim 11 wherein the first network node is operable as part of a relay network.

13. The method for provisioning a mobile communications device as recited in claim 11 wherein the parameters comprise a URL and a session identification number.

14. The method for provisioning a mobile communications device as recited in claim 11 wherein the first data context is a PDP context.

15. The method for provisioning a mobile communications device as recited in claim 11 wherein the first data context is non web based.

16. A registration server comprising:
   means for establishing a first data context between the registration server and a mobile communications device;
   means for receiving at the registration server from the mobile communications device a request for parameters that are to be used with a provisioning system;
   means for sending a request to the provisioning system for the parameters; and
   means for receiving the parameters from the provisioning system and for transmitting a response from the registration server to the mobile communications device, the response including the parameters, the parameters enabling the mobile communications device to receive provisioning of at least one aspect of the mobile communications device.

17. The registration server as recited in claim 16 wherein the registration server is operable as part of a relay network.

18. The registration server as recited in claim 16 wherein the parameters comprise a URL and a session identification number.

19. The registration server as recited in claim 16 wherein the first data context is a PDP context.

20. The registration server as recited in claim 16 wherein the first data context is non web based.

\* \* \* \* \*